United States Patent
Younes et al.

(10) Patent No.: US 9,598,993 B2
(45) Date of Patent: Mar. 21, 2017

(54) INTEGRATED PROCESS FOR $CO_2$ CAPTURE AND USE IN THERMAL POWER PRODUCTION CYCLE

(71) Applicant: Saudi Arabian Oil Company, Dhahran (SA)

(72) Inventors: Mourad Victor Younes, Abqaiq (SA); Wajdi Issam Al-Sadat, Freeville, NY (US); Esam Zaki Hamad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/744,977

(22) Filed: Jun. 19, 2015

(65) Prior Publication Data
US 2016/0369674 A1    Dec. 22, 2016

(51) Int. Cl.
*B01D 53/14*    (2006.01)
*F01N 3/08*    (2006.01)
(Continued)

(52) U.S. Cl.
CPC ......... *F01N 3/0857* (2013.01); *B01D 53/002* (2013.01); *B01D 53/1425* (2013.01);
(Continued)

(58) Field of Classification Search
CPC .............. B01D 53/002; B01D 53/1425; B01D 53/1475; B01D 53/1493; B01D 2252/103;
(Continued)

(56) References Cited

U.S. PATENT DOCUMENTS

| | | |
|---|---|---|
| 2013/0220130 A1 | 8/2013 | Ihms et al. |
| 2014/0056687 A1 | 2/2014 | Younes et al. |
| 2014/0099245 A1* | 4/2014 | Hamad .................. B01D 53/92 423/212 |

FOREIGN PATENT DOCUMENTS

| | | |
|---|---|---|
| WO | 2006/022885 A1 | 3/2006 |
| WO | 2012/100149 A1 | 7/2012 |

(Continued)

OTHER PUBLICATIONS

Chen et al., "Theoretical Research of Carbon Dioxide Power Cycle Application in Automobile Industry to Reduce Vehicel's Fuel Consumption", Applied Thermal Engineering 25 (2005), pp. 2041-2053.
(Continued)

*Primary Examiner* — Amber R Orlando
*Assistant Examiner* — Cabrena Holecek
(74) *Attorney, Agent, or Firm* — Abelman, Frayne & Schwab

(57) ABSTRACT

A process for reducing the amount of $CO_2$ released into the atmosphere with the exhaust gas stream produced by the combustion of a hydrocarbon fuel in an internal combustion engine (ICE) used to power a vehicle by capturing at least a portion of the $CO_2$ in a liquid sorbent on board the vehicle, recovering the $CO_2$ from the sorbent and compressing the $CO_2$ for temporary storage on board the vehicle, where the process is operated as a semi-closed system in which the liquid sorbent that captures the $CO_2$ serves as a working fluid and retains the $CO_2$ during the power generation cycle to produce mechanical energy or work, after which the $CO_2$ is desorbed for densification and recovery as an essentially pure gas stream and the working fluid is recycled for use in the process.

13 Claims, 5 Drawing Sheets

(51) Int. Cl.
  *B01D 53/92* (2006.01)
  *B01D 53/00* (2006.01)

(52) U.S. Cl.
  CPC ..... *B01D 53/1475* (2013.01); *B01D 53/1493* (2013.01); *B01D 53/92* (2013.01); *F01N 3/0885* (2013.01); *B01D 2252/10* (2013.01); *B01D 2252/103* (2013.01); *B01D 2252/204* (2013.01); *B01D 2252/2021* (2013.01); *B01D 2252/2025* (2013.01); *B01D 2252/2026* (2013.01); *B01D 2252/20468* (2013.01); *B01D 2252/20484* (2013.01); *B01D 2252/602* (2013.01); *B01D 2257/504* (2013.01); *B01D 2258/01* (2013.01); *B01D 2259/124* (2013.01); *B01D 2259/65* (2013.01)

(58) Field of Classification Search
  CPC .... B01D 2252/2021; B01D 2252/2025; B01D 2252/2026; B01D 2252/20468; B01D 2252/20484; B01D 2252/602; F01N 3/0857; F01N 3/0885
  See application file for complete search history.

(56) References Cited

FOREIGN PATENT DOCUMENTS

| | | |
|---|---|---|
| WO | 2012/100157 A1 | 7/2012 |
| WO | 2012/100165 A1 | 7/2012 |
| WO | 2012/100182 A1 | 7/2012 |

OTHER PUBLICATIONS

Persichilli et al., "Transforming Waste Heat to Power Through Development of a CO2-Based Power Cycle", Power Expo 2011 (May 2011), Rosemount, IL, pp. 1-9.
International Search Report and Written Opinion mailed Sep. 15, 2016 in related International Application PCT/US2016/036627.

\* cited by examiner

INTEGRATED PROCESS FOR $CO_2$ CAPTURE AND USE IN THERMAL POWER PRODUCTION CYCLE

FIELD OF THE INVENTION

This invention relates to carbon dioxide capture and energy recovery from the exhaust gas stream of an internal combustion engine in order to reduce carbon dioxide emissions into the atmosphere.

BACKGROUND OF THE INVENTION

The currently accepted thinking is that global warming is due to emissions of greenhouse gases such as carbon dioxide ($CO_2$) and methane ($CH_4$). About a quarter of global human-originated $CO_2$ emissions are currently estimated to come from mobile sources, i.e., automobiles, trucks, buses and trains that are powered by an internal combustion engine (ICE). This proportional contribution is likely to grow rapidly in the foreseeable future with the projected surge in automobile and truck ownership in developing countries. At present, the transportation sector is a major market for crude oil, and controlling $CO_2$ emissions is both an environmentally responsible and a desirable goal in order to maintain the viability of the crude oil market in the transportation sector in the face of challenges from alternative technologies, e.g., cars powered by electric motors and storage batteries.

Carbon dioxide management from mobile sources presents many challenges including space and weight limitations, the inability to achieve economies of scale and the dynamic nature of the operation of the ICE powering the mobile source.

Prior art methods for the capture of $CO_2$ from combustion gases have principally focused on stationary sources, such as power plants. Processes have been developed that use, for example, amines and amine-functionalized liquids and solutions to absorb $CO_2$ at temperatures ranging from ambient up to about 80° C. At temperatures above 100° C., and particularly in the range of from about 130° C. to 600° C. that are encountered in vehicles powered by an ICE, the amines exhibit low capacity for $CO_2$ absorption. Thus, the high temperature of the ICE exhaust gas makes direct treatment to remove $CO_2$ with liquid amine solutions impractical.

Aqueous ammonia has also been used in power plants to capture not only carbon dioxide, but $SO_x$ and $NO_x$ compounds. The absorption process must be conducted at relatively low temperatures to be effective, so that the solution must be cooled, e.g., to about 27° C. The so-called chilled ammonia process is described in international patent application WO 2006/022885 (2006), the disclosure of which is incorporated herein by reference.

An accepted prior art thermodynamic process used in stationary or fixed sources such as electrical power generation facilities for converting thermal energy into usable mechanical power is the Kalina Cycle. The Kalina Cycle can be implemented in order to increase the overall efficiency of the energy recovered from the fuel source. The process is a closed system that utilizes an ammonia-water mixture as a working fluid to improve system efficiency and to provide more flexibility under varying operating conditions that have cyclical peak energy demand periods. The Kalina Cycle would not be suitable for use on board a mobile source as a separate mechanical energy/work producing system due to the added weight and associated capital expense as compared to Rankine cycle systems.

Historically, the capture of $CO_2$ from mobile sources has generally been considered too expensive, since it involves a distributed system and a reverse economy of scale. The solution to the problem must take into account the practical considerations of on-board vehicle space limitations, the additional energy and apparatus requirements and the dynamic nature of the vehicle's operating cycle, e.g., intermittent periods of rapid acceleration and deceleration.

Some prior art methods that address the problem of reducing $CO_2$ emissions from mobile sources employ sorbent materials that can be subjected to regeneration and reuse of the $CO_2$ capture agent and make use of waste heat recovered from the various on-board sources. Oxy-combustion processes employed with stationary sources using only oxygen require an oxygen-nitrogen separation step which is more energy-intensive than separating $CO_2$ from the exhaust gases and would be more problematic if attempted on board a vehicle.

For purposes of describing the present invention, "mobile source" means any of the wide variety of known conveyances that can be used to transport goods and/or people that are powered by one or more internal or external combustion engines that produce a hot exhaust gas stream containing $CO_2$. This includes all types of motor vehicles that travel on land, as well as trains and ships where the exhaust from the combustion is discharged into a containing conduit before it is discharged into the atmosphere.

As used herein, the term "waste heat" is the heat that a typical internal combustion engine (ICE) produces that is contained principally in the hot exhaust gases (~300° C. to 650° C.) and the hot coolant (~90° C. to 120° C.). Additional heat is emitted and lost by convection and radiation from the engine block and its associated components, and other components through which the exhaust gas passes, including the manifold, pipes, catalytic converter and muffler. This heat energy totals about 60% of the energy that typical hydrocarbon (HC) fuels produced when combusted.

As used herein, the term "internal heat exchanger" means a heat exchanger in which the respective heating and cooling fluids originate in the mobile source.

As used herein, "stationary source" means any of the wide variety of known industrial systems and processes that burn carbon-containing fuels and emit $CO_2$ to produce heat, work, electricity or a combination thereof and that are physically fixed.

As used herein, the term "lean loading" means the amount of $CO_2$ remaining in the lean adsorption/absorption solution coming out of the bottom of the $CO_2$ stripper. In accordance with established usage in the field, loading is defined as the moles of $CO_2$ per mole of the amine group or other compound that captures the $CO_2$ by adsorption or relative absorption. As used herein, the terms "$CO_2$-rich solution" and "$CO_2$-lean solution" are synonymous with "rich loaded $CO_2$ solution" and "lean loaded $CO_2$ solution".

The problem of improving the efficiency of the energy recovered from hydrocarbon fuel combustion in an ICE has been addressed by taking advantage of the waste heat that is present in the engine coolant, the exhaust gas stream and the engine block, manifolds and other metal parts.

Incorporating an energy recovery system requires space, added weight and a specific capital expenditure. However, this investment can be worthwhile if the energy recovery system improves the overall efficiency of the fuel conversion to mechanical power, while reducing the $CO_2$ emissions into the atmosphere, and does this without substantially increasing fuel consumption.

It had long been the practice to use $CO_2$ as a non-toxic and non-flammable refrigerant gas in air conditioning systems prior to the use of chlorofluorocarbon (CFC) refrigerants. It has been proposed more recently in order to improve vehicle efficiency to operate an air conditioning system in reverse, utilizing heat from the vehicle's hot exhaust gas stream to generate additional power for use on board the vehicle. See, e.g., Chen et al., Theoretical Research of Carbon Dioxide Power Cycle Application in Automobile Industry to Reduce Vehicle's Fuel Consumption, Applied Thermal Engineering 25 (2005) 2041-2053. The systems contemplated are closed systems and are based on the moderate value of the critical pressure of $CO_2$. There is no capture and recovery of $CO_2$ from the exhaust gas stream in order to reduce $CO_2$ emissions into the environment.

A so-called thermal engine for power generation has been described that uses waste heat from the flue gases produced by a stationary source in a closed loop system that uses supercritical $CO_2$ ($ScCO_2$) as the working fluid. See Persichilli et al., Transforming Waste Heat to Power Through Development of a $CO_2$-Based Power Cycle, Electric Power Expo 2011 (May 2011) Rosemont, Ill. The $ScCO_2$ passes in heat exchange with hot flue stack gases and then through a turbine where the waste heat is converted to mechanical shaft work to produce electricity. A recuperator recovers a portion of the residual heat and the remainder is discharged from the system through a water or air-cooled condenser, from which the $CO_2$ exits as a subcooled liquid for passage to the pump inlet. Again, this closed system is adapted for integrated use with an industrial heat source to improve the overall efficiency of the associated system. It does not capture $CO_2$ for the purpose of directly reducing its emission into the atmosphere with the exhaust gases.

Incorporating a $CO_2$ capture system on board a mobile source to reduce $CO_2$ emissions adds weight, energy consumption, capital expenditures and maintenance. The problem is to provide a compact system that is easy to operate and maintain at an acceptable and competitive cost of manufacture.

Another problem addressed by the present invention is how to provide an effective and efficient $CO_2$ capture system in combination with an energy recovery and conversion system to produce the electrical and/or mechanical energy needed to compress the $CO_2$ for on-board storage, operate the associated systems and power the mobile source accessories.

A related problem is how to combine the $CO_2$ capture and energy recovery systems to increase the overall efficiency and reduce the number of components, weight, capital expenditure, and maintenance of the overall system and the vehicle.

Technical problems associated with $CO_2$ capture from mobile sources include how to further increase the efficiency of on-board $CO_2$ capture so that operating a conventional ICE powered by hydrocarbon fuels will remain economically and environmentally competitive with the all-electric and hybrid automobiles. These traditional problems are addressed by the processes and systems disclosed, for example in WO/2012/100149, WO/2012/100165, WO/2012/100157 and WO/2012/100182 which integrate $CO_2$ capture, heat recovery and $CO_2$ capture agent regeneration and reuse systems, hereinafter referred to as "multiple systems". However, utilizing multiple systems in mobile applications also increases weight, energy consumption, capital expenditure, and maintenance associated with operation of the vehicle.

The problem remains of further improving the efficient on-board capture of $CO_2$ from the hot exhaust gas stream from the ICE powering a mobile source.

SUMMARY OF THE INVENTION

The present invention broadly comprehends a process and an integrated system for use on board a vehicle powered by an internal combustion engine (ICE) that combines power generation with $CO_2$ capture and on-board $CO_2$ densification and storage that reduces irreversibilities and increases the overall efficiency of the process and the operating system to thereby maximize the recovery of useful energy from the hydrocarbon fuel used to power the vehicle.

More specifically, the present invention is directed to a process and system for $CO_2$ capture and energy recovery from an exhaust gas stream to reduce $CO_2$ emissions from a variety of conventional mobile applications in which the captured $CO_2$ is retained in the working fluid in an energy production cycle to produce work and the $CO_2$ is subsequently separated from the working fluid, compressed and temporarily stored on-board for eventual on-board conversion or recovery from the mobile source. The principal method and system of the invention are also applicable to $CO_2$ from recovered stationary sources for disposition, e.g., by sequestration.

The process of the invention uses a $CO_2$-absorbing liquid, sometimes referred to in this description and in the claims as the "solution," or the "sorbent solution", in an absorption zone by direct contact or indirect contact, e.g., using a membrane absorber, with a $CO_2$-containing exhaust gas stream to absorb all or a portion of the $CO_2$ that would otherwise be discharged into the atmosphere.

Water is a preferred solvent in which amines and other $CO_2$ absorbents such as bicarbonates are dissolved to operate the system for reasons of economics, availability and the absence of environmental concerns if it is discharged from the system in favor of a replacement with fresh water. Alcohols can be used to capture $CO_2$ and can be used as the solvent or as the solute. Colloidal solutions that contain, for example, water as a solvent and suspended solid sorbents that capture $CO_2$ can also be used in the process of this invention. Heating such solutions will result in $CO_2$ desorption from the solid particles and water evaporation to drive the turbine. As will be apparent to one of skill in the art, families of $CO_2$ absorbents and adsorbents and solvents can be selected based on the specific conditions of use including climate, availability of sorbent and solute materials, and the type of ICE. For the purposes of the following description, water is selected as the working fluid.

The operation of the process is similar to that of prior art systems such as the Kalina Cycle and absorption systems. However, both of those processes are closed systems, used for power generation in the case of the Kalina Cycle and for cooling or heating in the case of absorption systems.

As used in the description that follows and in the claims, the term "external heat exchanger" means a heat exchanger which is air-cooled or water cooled, i.e., the energy sink that is required to close the energy loop is external to the process or system.

The $CO_2$-rich solution exiting the absorber is heated via one or more heat exchangers and passed to a boiler that is heated by the hot exhaust gas stream from the ICE. In the boiler, the $CO_2$ is desorbed from the sorbent solution and at least a portion of the water in the solution is evaporated to form steam. Thereafter, the vapor phase is passed to a separation zone in which a hot liquid/vapor separator produces a stream of the now-concentrated sorbent solution having a higher concentration of the $CO_2$-absorbing compound.

The $CO_2$/water vapor stream from the separation zone is then passed to a superheating zone where it is subjected to heat exchange with the hot exhaust gas stream passed directly from the ICE that is at a temperature in the range of from 200° C. to 800° C. The superheated vapor phase is expanded in one or more turbines to generate power. In the case of multiple turbines, inter-stage heating by heat exchange with the hot exhaust gases is employed to maximize the cycle efficiency of the working fluid containing the captured $CO_2$.

The liquid $CO_2$-lean solution leaving the liquid/vapor separator is passed to a first internal heat exchanger to heat the $CO_2$-rich solution and increase the cycle efficiency. The $CO_2$-lean solution is then expanded in a turbine or through an expansion valve and it is then cooled, in an external heat exchanger by contact with ambient air or the engine coolant, to the desired absorber temperature for passage to the absorption zone.

The $CO_2$/water stream leaving the turbine is passed to a second internal heat exchanger to provide heat to the $CO_2$-rich solution and increase the cycle efficiency before it is cooled, by an external heat exchanger operated by contact with ambient air or the engine coolant, to the temperature of a $CO_2$/water separator from which a $CO_2$-rich gas stream is recovered and condensed water is recovered as a liquid.

All or a portion of the condensed water can be mixed with the concentrated sorbent solution from the separator to restore the desired concentration to the solution, which is then pumped to the absorber inlet. The $CO_2$-rich gas stream is compressed in a multi-stage $CO_2$ compressor with inter-stage cooling and a water knock-out to remove any water carried over with the $CO_2$ from the condenser/separator. The compressed pure $CO_2$ is passed to a high pressure tank for temporary on-board storage pending ultimate disposition. Moderate or no compression can also be practical for $CO_2$ conversion by a chemical change or storage of $CO_2$ in a high-capacity retention material, such as metal-organic frameworks (MOFs) and covalent-organic frameworks (COFs). In the case of $CO_2$ captured from a stationary $CO_2$ source for permanent disposition, the captured $CO_2$ can be conveyed in a pipeline for permanent storage, e.g., by underground sequestration.

The power produced by the turbine(s) can be used to drive one or more absorbent liquid pumps and/or $CO_2$ compressors. Any excess power can be used to charge the vehicle's battery or to power on-board electrical components.

The present invention provides a highly efficient process and system that recovers energy from the waste heat of the exhaust gas stream by utilizing the captured $CO_2$ as a component in a heated and pressurized working fluid in a process which produces mechanical and/or electric energy to meet the requirements of the pumps and/or $CO_2$ compressors on board the vehicle.

From the above description, it will be understood that the invention is directed to a process for reducing the amount of $CO_2$ released into the atmosphere with the exhaust gas stream produced by the combustion of a hydrocarbon fuel in an ICE used to power a vehicle by capturing at least a portion of the $CO_2$ with a sorbent on board the vehicle, recovering the $CO_2$ from the sorbent and compressing the $CO_2$ for temporary storage on board the vehicle, the process characterized by a. passing the hot exhaust gas stream from the ICE through a plurality of heat exchangers in a first heat exchange zone to reduce the temperature of the exhaust gas stream to a value in a predetermined temperature range;

b. contacting the cooled exhaust gas stream in an absorption zone with a liquid $CO_2$ sorbent solution at a temperature within a predetermined temperature range, the solution comprising water in which is dissolved at least one compound that reversibly combines with $CO_2$ to capture at least a portion of the $CO_2$ from the exhaust gas stream to provide a $CO_2$-rich solution;

c. separating the $CO_2$-rich solution from the remaining exhaust gas stream that is of reduced $CO_2$ content;

d. discharging the remaining exhaust gas stream of reduced $CO_2$ content into the atmosphere;

e. pressurizing the $CO_2$-rich solution and passing it into a boiler for passage in a first heat exchange relation with a partially-cooled exhaust gas stream to raise its temperature to desorb the $CO_2$ and provide a concentrated $CO_2$-lean sorbent solution and to vaporize a portion of the water from the sorbent solution to provide a vaporized water/$CO_2$ mixture;

f. separating the $CO_2$-lean sorbent solution from the vaporized water/$CO_2$ mixture in a first separation zone;

g. passing the vaporized water/$CO_2$ mixture into a superheating zone where it passes in a second heat exchange relation with the hot exhaust gas stream directly from the ICE to further increase the temperature of the mixture to about 400° C.;

h. passing the superheated water/$CO_2$ mixture to a turbine and expanding the mixture to a predetermined lower pressure value;

i. passing the hot expanded water/$CO_2$ mixture in heat exchange with the pressurized $CO_2$-rich solution;

j. passing the water/$CO_2$ mixture to a condensing heat exchanger to lower its temperature to condense substantially all of the water vapor to the liquid state;

k. separating the condensed water from the $CO_2$ in a second separation zone and mixing all or a portion of the condensed water with the sorbent solution upstream of the absorption zone or discharging the water from the vehicle;

l. recovering the substantially pure $CO_2$ from the second separation zone and passing it to a compression zone to densify the $CO_2$ and discharging any remaining water;

m. recovering the pressurized pure $CO_2$ and passing it to an on-board vessel for storage or for further processing to reduce its volume by a physical and/or chemical change of state;

n. passing the pressurized $CO_2$-lean solution from the first separation zone in heat exchange relation to increase the temperature of the pressurized $CO_2$-rich solution from the absorption zone;

o. introducing the pressurized $CO_2$-lean solution into an expansion device to produce mechanical energy;

p. passing the reduced-pressure concentrated $CO_2$-lean solution from the expansion device to a mixing valve through which water is added to restore the desired concentration of the sorbent solution;

q. cooling the $CO_2$-lean solution to the predetermined temperature range prior to passing it into the absorption zone; and r. pressurizing the $CO_2$-lean sorbent solution upstream of the absorption zone.

As will be understood by one of ordinary skill in the art, the temperature of the superheated vaporized water/$CO_2$ mixture in step (g) above can vary from 400° C. and will depend on the optimum operating conditions of the system.

The reduction in volume of the $CO_2$ can be achieved by maintaining it in a liquid, solid or super-critical state. As also noted above, solvents other than water can be employed in the practice of the process.

BRIEF DESCRIPTION OF THE DRAWINGS

The invention will be further described below and with reference to the attached drawings in which the same or similar elements are identified by the same number, and in which.

DETAILED DESCRIPTION OF INVENTION

As discussed above, the process of the present invention operates as a semi-closed system that captures $CO_2$ from an exhaust gas stream of an ICE and produces mechanical energy, or work, utilizing a working fluid that contains the $CO_2$ in the power generation cycle. The process can be used to advantage for $CO_2$ capture from a mobile source powered by an internal combustion engine (ICE).

Figure 1:
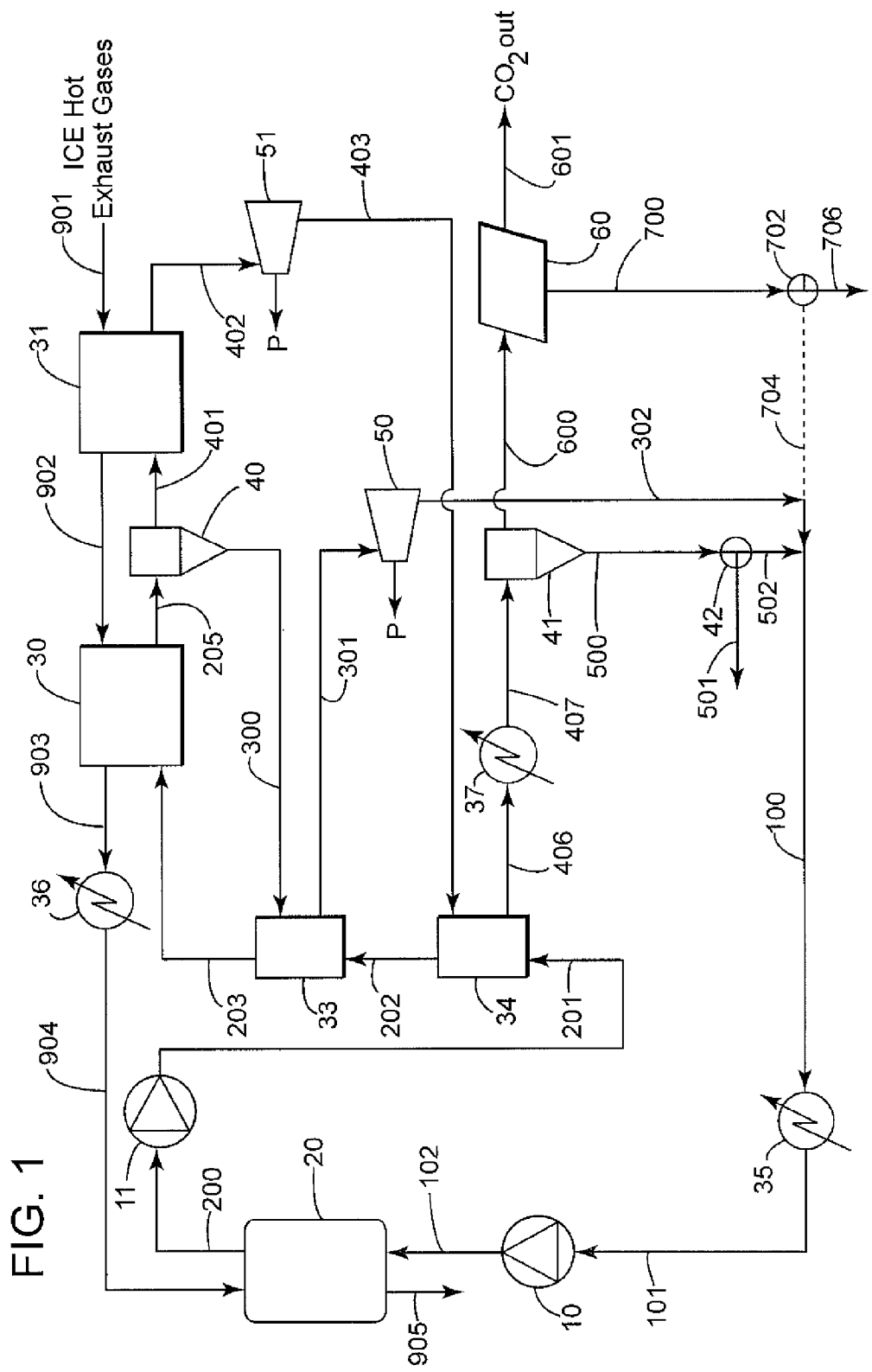
FIG. 1 is a schematic diagram of an embodiment of the process of the invention in a basic cycle in which $CO_2$ is captured and compressed in a power production cycle.

Referring to an embodiment of the invention schematically illustrated in FIG. 1, a simplified cycle of the process is depicted in which $CO_2$ is captured and compressed in a power production cycle.

A lean loaded $CO_2$ absorbing solution (hereafter referred to as "solution") such as aqueous potassium carbonate is transferred via pump (10) as stream (102) to the absorption unit (20) to capture $CO_2$ from the exhaust gas stream at atmospheric or near atmospheric pressure.

The $CO_2$ absorption unit (20) can be a direct contact liquid/gas column such as packed column or an indirect contact membrane absorption device such as gas-liquid membrane contactor. For convenience, the description that follows will refer to the practice of the process of the invention in a direct contact absorption unit. However, as will be understood by those of ordinary skill in the art, an indirect absorber can be employed with substantially the same effect.

The hot exhaust gas stream (901) exiting the ICE is first cooled by passage through the superheater (31) and enters the boiler (30) as reduced temperature stream (902). The exhaust gas stream (903) exiting the boiler (30) is further cooled to a predetermined temperature between 30° C. and 100° C. in a heat exchanger (36) and the cooled stream (904) enters the absorption unit (20) where $CO_2$ is absorbed by the cooled $CO_2$-lean loaded solution that enters the absorber (20) via stream (102) at a temperature between 30° C. and 100° C.

The remaining exhaust gas (905) leaves the absorber (20) after $CO_2$ capture and is discharged into the atmosphere.

The $CO_2$-rich solution leaves the absorber (20) via stream (200) and is pressurized by pump (11) to the high pressure value of the system, e.g., to 4 MPa, and passes as stream (201) to a first internal heat exchanger (34) where it is heated about 100° C. by the $CO_2$/water stream (403) leaving turbine (51) as will be described in further detail below.

The pressurized $CO_2$-rich solution (202) exits the internal heat exchanger (34) and passes through a second internal heat exchanger (33) for further heating. The second internal heat exchanger (33) is heated by the high pressure $CO_2$-lean solution (300). The high pressure $CO_2$-rich solution (203) then enters boiler (30).

The high pressure $CO_2$-rich solution (203) is partially evaporated in boiler (30) which is heated by the hot exhaust gas stream (902) downstream of the superheater (31) which is in close proximity to the exhaust manifold of the ICE; the $CO_2$ and water are vaporized because of their lower normal boiling points.

The high pressure $CO_2$-rich liquid/gas mixture (205) leaves the boiler (30) at an increased temperature of, e.g., about 210° C., and enters a liquid/vapor separator (40) that separates the gaseous $CO_2$/water mixture from the remaining high pressure $CO_2$-lean solution (300).

The high pressure $CO_2$-lean solution (300) leaves the liquid/vapor separator (40), enters internal heat exchanger (33) and passes as stream (301) to an expansion device (50), e.g., a turbine or throttle valve, where it is expanded to a lower pressure before passing to the liquid header (100) as stream (302). The expansion device (50) recovers power P for the system from the waste heat and provides mechanical energy to pumps (10) and (11).

The $CO_2$/water vapor mixture (401) exiting the liquid/vapor separator (40) passes through the superheater (31) that is heated by the exhaust gas stream (901) and exits as superheated stream (402) at a temperature of approximately 400° C. and expands in a turbine (51) to produce power, exiting at approximately atmospheric pressure as stream (403).

The power P from the turbine (51) is applied to operate pumps in the system, to compress $CO_2$ and/or to operate the process utilities, as required.

The low pressure $CO_2$/water exiting the turbine (51) as stream (403) passes through an internal heat exchanger (34) and exits via stream (406) to another heat exchanger (37) where it is further cooled to approximately 40° C. in order to condense the water. After exiting the heat exchanger (37) via stream (407), the low pressure $CO_2$/water passes to a separator (41) where the condensed water is separated from the $CO_2$ gas. The condensed water stream (500) exiting the separator (41) is composed of water with some dissolved $CO_2$, all or a portion of which can be passed to the liquid header (100) as stream (502); any excess water can be discharged from the system as stream (501).

The liquid solution (100) is further cooled in heat exchanger (35) to the desired $CO_2$ absorption temperature before it is fed to the suction line (101) of pump (10) that feeds the $CO_2$ absorber (20).

The vapor stream (600) consisting principally of $CO_2$ passes from the separator (41) to the compression zone (60) where it is compressed to produce a high-purity $CO_2$ stream (601). The high-purity $CO_2$ stream (601) can be passed to on-board storage in mobile applications and to storage and/or a pipeline in the case of stationary or fixed $CO_2$ sources. Any remaining water is condensed by intercooling and phase separation and discharged from the system as water stream (700).

All or a portion (704) of the condensed water (700) can optionally be returned via a three-way valve (702) to the loop (100) or to the pump suction line (101) in order to control the water content of the lean absorption solution in the process and prevent salt precipitation. Fresh make-up water can also be used for this purpose, alone or in combination with condensed water stream (700). Alternatively, the condensed water (700) can be discharged (706) from the system.

Figure 2:
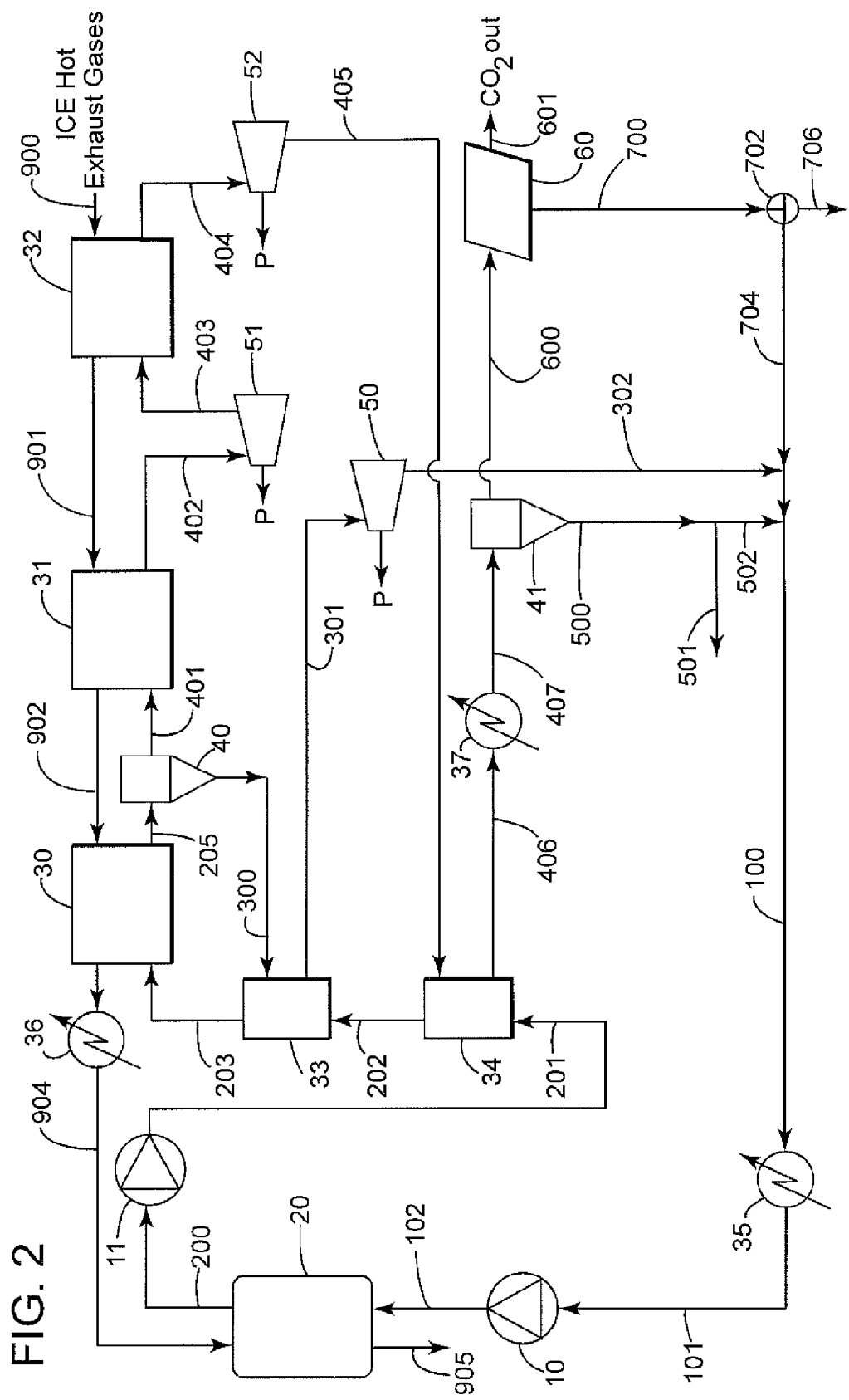
FIG. 2 schematically illustrates an embodiment of the invention that includes an optional re-heat step.

In another embodiment of the invention schematically illustrated in FIG. 2, an optional re-heating step is provided in which the exiting vapor stream is re-heated after a first expansion of the working fluid in order to increase the overall cycle efficiency.

In this embodiment, the hot exhaust gas stream (900) enters the system through heat exchanger (32) where the medium pressure $CO_2$/water mixture (403) at, e.g., one Mpa, is re-heated to about 400° C. and exits as heated stream (404).

The cooled exhaust gas stream (901) from heat exchanger (32) enters the superheater (31) and follows the same path that was described in FIG. 1.

The superheated $CO_2$/water stream (402) from superheater (31) is expanded in turbine (51) to a medium pressure of about 1 MPa and exits as stream (403). Stream (403) passes to heat exchanger (32) to be re-heated by the entering exhaust gas stream (900) to a temperature of about 400° C. and then passes as stream (404) to turbine (52). The expanded low pressure stream (405) exits the turbine (52) at approximately atmospheric pressure and passes to internal heat exchanger (34) to exchange heat with the high pressure $CO_2$ rich solution stream (201), and exits as stream (406).

The process steps of stream (406) are the same as those described above in conjunction with the embodiment of FIG. 1.

The re-heating step is followed by a further expansion step to reduce the irreversibilities in the system and increase the overall system efficiency. Other aspects of the process of FIG. 1, including the use of the condensate stream (700) that may be injected back into the loop via line (100) or (101) as make-up water in order to control the water content in the process and prevent salt precipitation is also applicable to the embodiment of FIG. 2.

Figure 3:
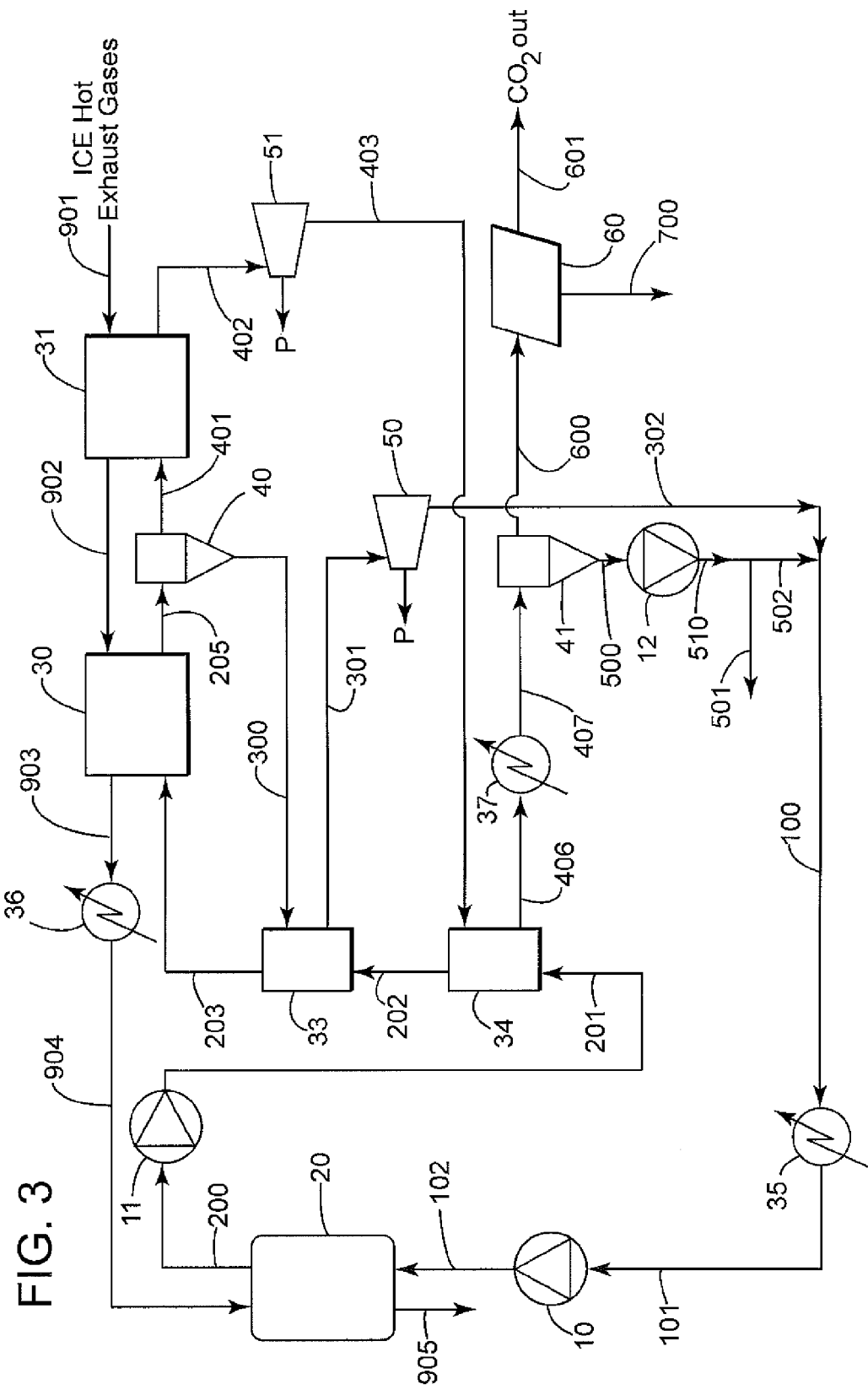
FIG. 3 schematically illustrates an embodiment of the invention in which the pressure at the turbine exit is reduced to below atmospheric pressure (vacuum) in order to increase expansion power recovery.

In a third embodiment of the invention that is schematically illustrated in FIG. 3, the pressure at the turbine exit is reduced to below atmospheric pressure, e.g., to a vacuum in order to increase expansion power recovery.

This advantage can be realized because the $CO_2$ water saturation pressure at ambient temperature is less than atmospheric pressure allowing for a higher power recovery from the fluid expansion and an increase in the net power and efficiency of the process of the invention.

The process in FIG. 3 is similar to the first embodiment as described above in connection with FIG. 1, with the difference being that the outlet pressure of stream (403) exiting the turbine (51) is reduced to, i.e., 20 kPa absolute pressure and a pump (12) is added to the process to pressurize the liquid stream (500) to near atmospheric pressure.

The superheated $CO_2$/water stream (402) leaving the superheater (31) is expanded in turbine (51) to 20 kPa in order to recover the expansion energy. The $CO_2$/water stream leaves the turbine via stream (403) to enter internal heat exchanger (34) and the $CO_2$ water stream exits as stream (406).

The $CO_2$/water stream (406) is further cooled in heat exchanger (37) to achieve the desired separation of the $CO_2$ by condensing the water. Stream (407) exiting heat exchanger (37) passes to a separator (41) where a $CO_2$-rich stream (600) is recovered under a vacuum, e.g., 20 kPa, and compressed in the multi-stage compressor (60) to the required outlet pressure and the pressurized stream (601) and passed for storage or further processing.

The condensate stream (500) composed mainly of water is pressurized by pump (12) to the liquid header line (100) pressure, e.g., 100 kPa to complete the cycle. Stream (510) exiting pump (12) is conveyed in whole or in part for addition to stream (100) via stream (502), the excess being discharged from the system as stream (501).

The same vacuum condensation principle can be applied to the re-heat configuration by reducing the outlet pressure of turbine (52), e.g., to 20 kPa, in order to recover additional work energy and increase the efficiency of the process.

Figure 4:
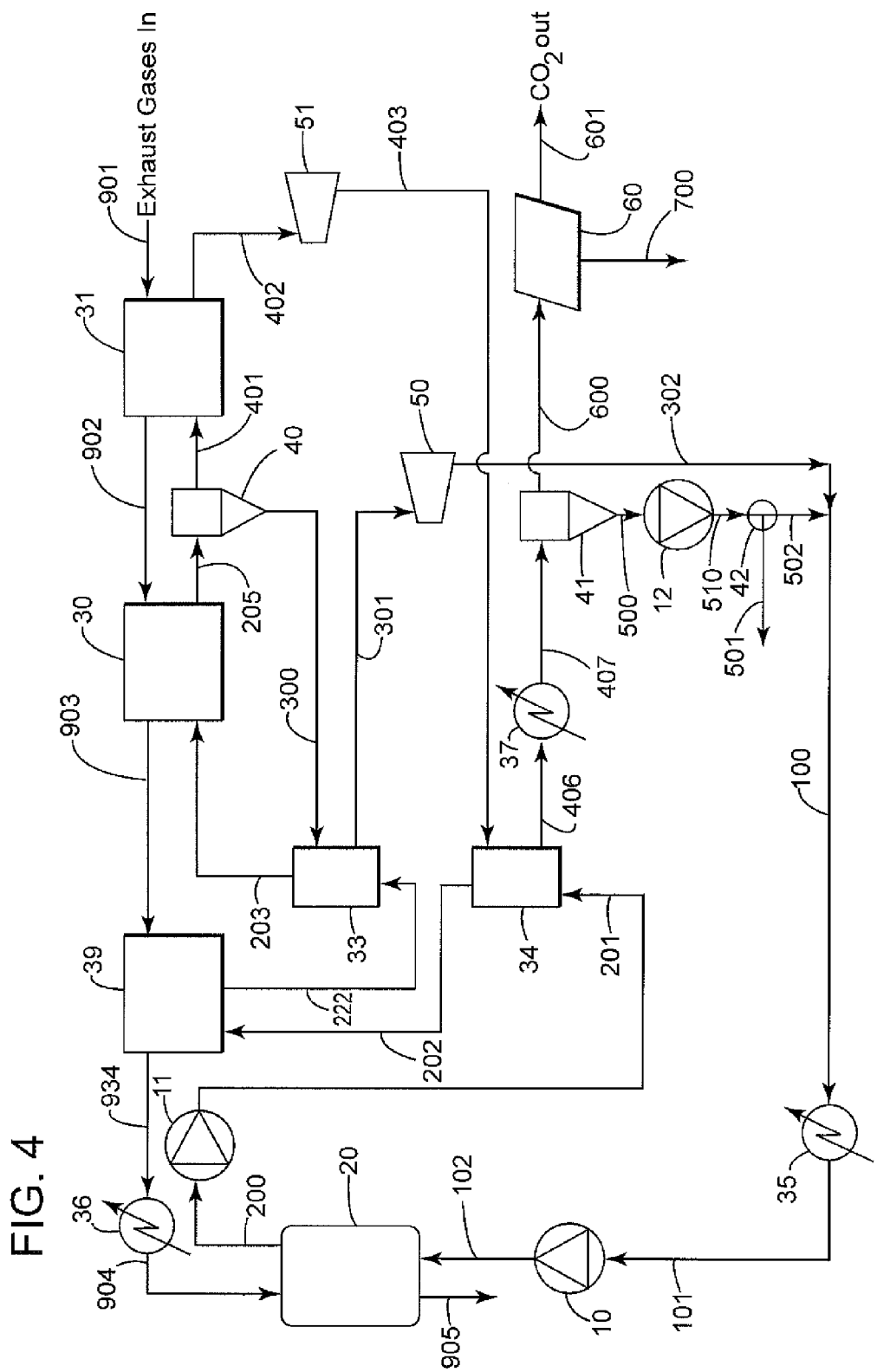
FIG. 4 schematically illustrates a fourth embodiment of the invention in which an additional internal heat exchanger extracts heat from the exhaust gas stream.

In a fourth embodiment of the invention that is schematically illustrated in FIG. 4, the exhaust gas stream (903) is further cooled exchanging heat with the high pressure $CO_2$-rich solution stream (202) in a step to increase the overall cycle efficiency, capturing more $CO_2$ or providing more power for a same $CO_2$ capture rate.

The process in FIG. 4 is similar to the embodiment as described above in connection with FIG. 3, with the difference of the inclusion of an additional internal heat exchanger (39) between heat exchanger (30) and external heat exchanger (36) on the exhaust gas line, and between heat exchanger (34) and heat exchanger (33) on the high pressure $CO_2$-rich solution.

The exhaust gases leaving heat exchanger (30) in stream (903) heat the high pressure $CO_2$-rich solution stream (202) exiting heat exchanger (34). The cooler exhaust gas stream (934) leaves heat exchanger (39) to enter heat exchanger (36) and continue the process as described in FIG. 3.

The high pressure $CO_2$-rich solution stream (202) leaving heat exchanger (34) is heated in heat exchanger (39) by the hot exhaust gases before entering heat exchanger (33) for further heating via stream (222). Afterwards, the high pressure $CO_2$-rich solution undergoes the same steps described in FIG. 3 of the process.

In yet another embodiment, it is possible to integrate heat exchanger (39) in the re-heat configuration of the system as described in FIG. 2 or in the above atmospheric pressure outlet configuration as described above and represented in FIG. 1 of the invention.

As will be apparent to one of ordinary skill from the above description of the process and system, the fluids circulated to the three heat exchanges (e.g., 33, 34 and 39) can be varied depending upon the operating characteristics and requirements of the process. For example, the thermodynamic characteristics can be adjusted in order to obtain additional power from the turbines (50, 51, 52), as discussed further below.

As described above in connection with the previous embodiments, all or a portion of water stream (700) can be injected back into the loop in line (100) or (101) in order to control the water content of the solution used in the process and prevent salt precipitation. Fresh make-up water can also be used for this purpose, either alone or in combination with water from stream (700).

It is noted that the process shown in FIG. 4 also includes a re-heat step as was previously shown in FIG. 2 to further increase process efficiency.

The process according to the invention can be operated to achieve a predetermined $CO_2$ capture goal, e.g., 25%, or to produce a predetermined required amount of power.

In a $CO_2$ capture application, $CO_2$ compression is the main energy-intensive component of the system and the net power output is the net power produced by the turbines minus the power consumed by the pumps and in the $CO_2$ compression step or steps.

Since pumps are indispensable to the operation of the system, there can be little or no variation in meeting requirements for the operation of the pump; however, the extent of $CO_2$ compression can be varied and is dependent on the $CO_2$ capture rate and/or the on-board storage capacity.

In a power-oriented operational mode with no $CO_2$ capture rate requirements, the rate can be adjusted according to the desired net power output, e.g., by reducing the $CO_2$ capture rate to reduce the $CO_2$ compression power requirement, thereby increasing the net power output of the system.

Alternatively, if the $CO_2$ capture rate is to be fixed, e.g., within a given range, or not less than a predetermined value, the system should operate at the required $CO_2$ capture flow rate with no degree of freedom on the net power production.

The choice of the pressure and temperature throughout the system dictates the parameters of the production cycle and the potential $CO_2$ capture rate. For example, superheating and re-heating can be used to increase the power output and reduce the irreversibilities in the system. As a result, superheating and re-heating do not affect the $CO_2$ capture rate, but do affect the net power produced.

An important parameter that does affect the $CO_2$ capture rate is the temperature and pressure of stream (205) exiting heat exchanger (30) and entering separator (40) since the conditions of this stream will determine how much $CO_2$ and water go into the vapor phase in separator (40).

The temperature and pressure at the outlet of heat exchanger (37), as well as the operating temperature and pressure of separator (41) relate to the actual rate of $CO_2$ capture because the temperature and pressure of separator (41) control the ratio between the liquid and vapor phase. It is therefore possible to regulate the system's operation to achieve the desired power production and/or level of $CO_2$ capture and emissions reduction by controlling the temperature and pressure in these devices (37, 41).

The process according to the invention can use, in addition to the heat of the exhaust gas stream, one or more different sources of energy such as engine coolant energy, solar energy, or any other available form of recoverable thermal energy, to support the operation of the heat exchangers (30) and/or (31) and/or (32) and/or (39) to maximize the power production.

Recoverable energy such as kinetic, mechanical and/or electrical energy can be used in the process to increase the output of the turbines and/or operate the $CO_2$ compressor. Energy recovery systems and devices that are used on all-electric or hybrid motor vehicles can also be employed on vehicles powered by an ICE to provide electrical power directly or through a storage battery or other device.

Any cooling device in the process used to cool a stream with an ambient or external stream, e.g., an air-cooled heat exchanger (36), can be replaced by an energy recovery device, e.g., a thermo-electric device or other device that captures and converts heat to energy while cooling the working fluid stream to the desired temperature, and the recovered energy can be utilized in the process. For example, instead of cooling the exhaust gas stream from 200° C. to 60° C. in a heat exchanger, a thermoelectric device can be utilized to cool stream (903) to the desired temperature while producing electricity from the recovered energy.

The process of the invention can also be modified by changing the position of the pumps or replacing the pumps with ejectors. It is also possible, depending on the type of the absorber (20), i.e., closed type, membrane absorber, or other, to combine pump (10) and pump (11) in a single pump that is either upstream of the absorption unit (20) or, preferably in the location of downstream pump (11) in order to carry out the absorption at a lower solution pressure.

The process of the invention can also employ various processes for $CO_2$ and water separation such as membranes or other separation means.

The $CO_2$ absorbing solution used in the process according to the invention can be a water-based solution containing salts and/or amines and/or other molecules that capture $CO_2$, by either a physical or chemical process. The $CO_2$ sorbent solution used in the process of the invention can be selected from the following:

a. a solvent-based solution containing salts and/or amines and/or other molecules that physically or chemically absorb $CO_2$;

b. a solvent-based or water-based carrier in which solid $CO_2$ adsorbent particles are dispersed and the $CO_2$ is adsorbed by the particles at low temperature and desorbed from the particles at high temperatures, the particles being regenerated and recycled, and the liquid carrier also preferably adsorbs or absorbs the $CO_2$ physically or chemically at low temperatures and desorbs the $CO_2$ at high temperatures in order to reduce the flow rate and contactor size;

c. a colloid fluid or crystalloid fluid reversibly absorbing and/or adsorbing $CO_2$ and desorbing $CO_2$ at the appropriate conditions; and d. a mixture of absorbing and adsorbing liquids.

As will be understood from the above descriptions and examples, the process of the invention broadly comprehends the combination of $CO_2$ capture in an integrated system that reduces irreversibilities and thereby increases the overall efficiency of the processing and operating system.

In addition to increased efficiency and waste heat recovery in mobile applications, the process of the invention includes the advantages of requiring a reduced number of components as compared to separate heat recovery and $CO_2$ recovery systems. The integrated system saves space and weight on board mobile sources and reduces capital expenditures and operational maintenance costs.

Figure 5:
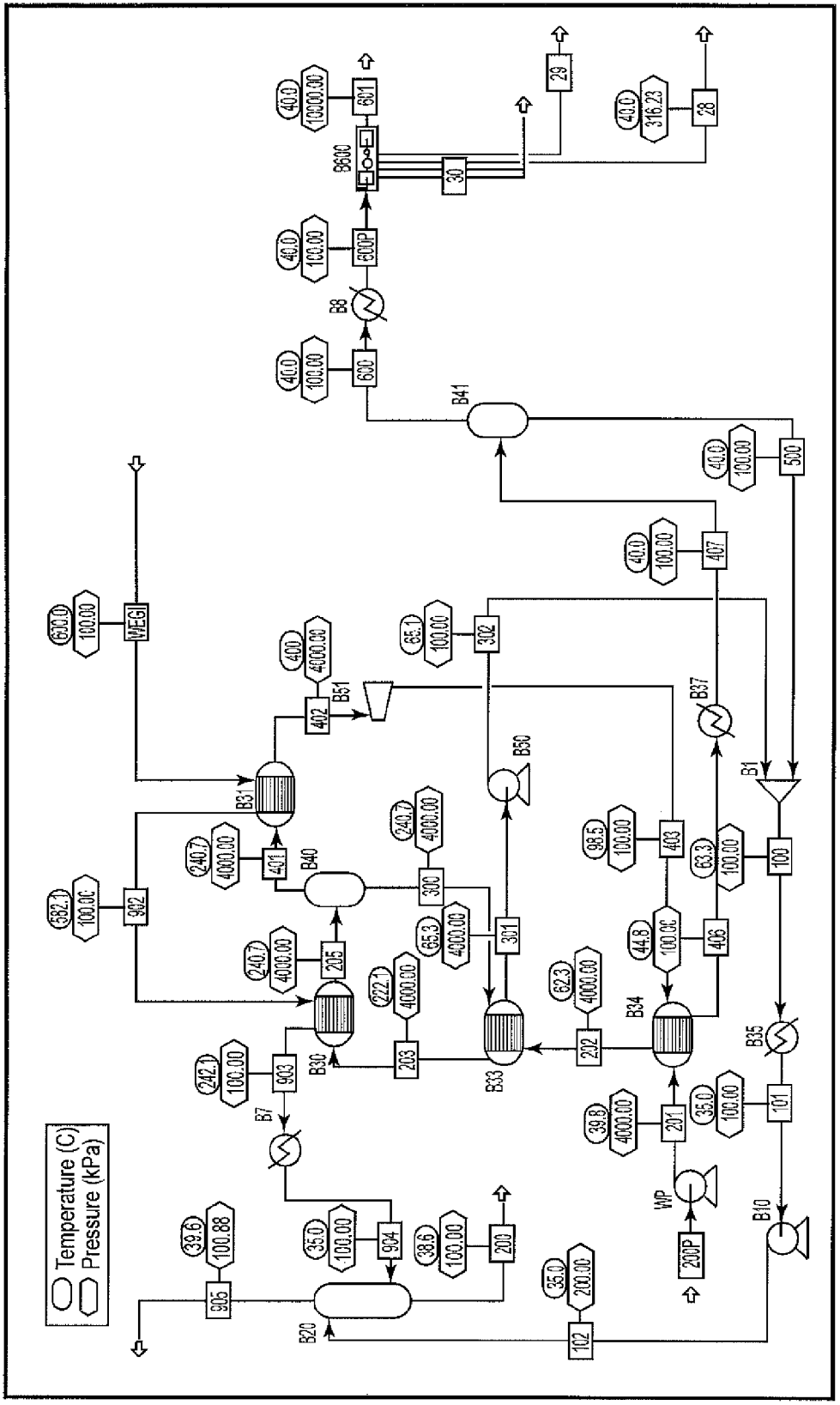
FIG. 5 is a screenshot of an Aspen simulation for a process that is similar to the process described in FIG. 2.

FIG. 5 is a screen shot of an Aspen Plus Simulation flowsheet representing an embodiment of the invention similar to the process that is depicted in FIG. 2.

Example

The process according to the best mode of the embodiment illustrated in FIG. 3 for the practice of the process of the invention for mobile applications will be described in further detail in this example. A lean aqueous potassium carbonate $CO_2$ absorbing solution is pressurized by pump (10) and introduced as stream (102) into the absorption unit (20) to capture $CO_2$ from the cooled exhaust gas stream. The $CO_2$ absorption unit (20) can be a direct contact liquid-gas column or an indirect contact membrane absorption device that operates at atmospheric or near atmospheric pressure.

The hot exhaust gas stream (901) is cooled in passes through superheater (31) and boiler (30). The exhaust gas stream (903) exiting the boiler (30) is further cooled to a predetermined temperature between 30° C. and 100° C., depending on ambient conditions, in a heat exchanger (36) and the cooled exhaust gas stream (904) enters the absorption unit (20) where $CO_2$ is absorbed by the $CO_2$-lean solution (102) to complete the absorption.

The remaining portion of the exhaust gas stream (905) of reduced $CO_2$ content exits the absorber (20) and is discharged into the atmosphere. In an alternative embodiment, prior to its discharge into the atmosphere, the flue gas stream (905) can be reheated, e.g., to expand its volume. The reheating of stream (905) can be accomplished using the heat from stream (903) entering heat exchanger (36). In this embodiment, heat exchanger 36 can be replaced by an internal heat exchanger or the system can incorporate an internal heat exchanger upstream of heat exchanger (36) in which stream (903) provides heat to stream (905).

The $CO_2$-rich solution (200) exits the absorber (20) and is pressurized by pump (11) to the high pressure value of the system, e.g., to 4 MPa, and passes as pressurized stream (201) to a first internal heat exchanger (34) where it is heated by the $CO_2$/water stream (403) leaving turbine (51) as will be described in further detail below.

The heated high pressure $CO_2$-rich solution (202) exits the first internal heat exchanger (34) and passes through a second internal heat exchanger (33) for additional heating. The second internal heat exchanger (33) is heated by the hot high pressure $CO_2$-lean solution (300) from which $CO_2$ has previously been recovered. The high pressure $CO_2$-rich solution (203) then enters the boiler (30).

The pressurized $CO_2$-rich solution (203) is partially evaporated in boiler (30) which is heated by the hot exhaust gas stream (902); the portion of absorbed $CO_2$ is desorbed and some water is vaporized because of their lower normal boiling points. As the concentration of the potassium carbonate increases, the boiling point of the solution also rises, so that the solution remains in a flowable liquid state.

The high pressure $CO_2$-rich solution (205) passes from the boiler at a temperature of about 210° C. and enters a liquid/vapor separator (40) that separates the $CO_2$/water gaseous mixture from the remaining pressurized $CO_2$-lean solution.

The pressurized $CO_2$-lean solution (300) leaves the liquid/vapor separator (40), passes through internal heat exchanger (33) and then as stream (301) enters expansion device (50), e.g., a turbine or throttle valve, where it is expanded to a lower pressure before passing as stream (302) to the lower pressure process liquid header or conduit (100).

The expansion device (50) can be a throttle valve or a turbine that recovers the power P required for the operation of pumps (10), (11) and as in FIG. 4 (12). The expansion device (50) is preferably linked directly to the shaft of the high pressure pump (11). Alternatively, electric power can be recovered to charge a battery that delivers the electricity to drive the pumps. In another embodiment, one or more pumps can be connected to a common drive shaft from the turbine.

The $CO_2$/water vapor mixture (401) exiting the liquid/vapor separator (40) passes through the superheater (31) that is heated by the hot exhaust gas stream (901) and exits as a superheated $CO_2$/water mixture (402) at a temperature around 400° C. Stream (402) is expanded in a turbine (51) to the vacuum pressure value of the system, e.g., 20 kPa, and produces power P which is applied as needed to operate pumps in the system, to compress $CO_2$ and to operate the process utilities The low pressure $CO_2$/water mixture leaves the turbine (51) as stream (403) to enter internal heat exchanger (34) and then heat exchanger (37) as stream (406).

The $CO_2$/water stream (406) is cooled to condense the water to achieve the desired separation of $CO_2$ and water. Stream (407) exits heat exchanger (37) and passes to separator (41) where a $CO_2$-rich stream (600) is recovered under vacuum, e.g., 20 kPa.

The vapor stream (600) is composed mainly of $CO_2$ and passes to the compression zone (60) where it is compressed to provide the compressed high-purity $CO_2$ stream (601).

The high purity $CO_2$ stream (601) can be passed to on-board storage in mobile applications, and eventually to permanent underground or other storage via pipeline. Any remaining water is condensed by intercooling and phase separation and discharged from the system as waste water stream (700).

The condensate stream (500) from the separator (41) is mainly composed of water with some dissolved $CO_2$ and is pressurized by pump (12) for introduction into the liquid header line (100) at a pressure of about 100 kPa. Stream (510) exiting pump (12) is passed in whole or in part to sorbent solution stream (100) as stream (502), any excess being discharged from the system as stream (501).

The absorbent solution stream (100) is further cooled in heat exchanger (35) to the predetermined $CO_2$ absorption temperature and then passed to the suction line (101) of pump (10) for introduction into the $CO_2$ absorber (20).

No systems of the prior art concerned with reduction of $CO_2$ emissions contemplate the utilization of $CO_2$ from exhaust streams as a working fluid in energy recovery systems.

Example

A computer analysis/simulation was prepared using the Aspen Technology program model in lieu of bench testing. The model corresponds generally to the schematic arrangement depicted in FIG. 1. The calculations are based on a 25% $CO_2$ capture rate with no pressure drop across the equipment.

It will be understood that the results are indicative and although some uncertainties remain, the results provide useful data for the specified condition. The following Table includes the characteristics of the various streams described above for the Aspen Simulation presented in FIG. 5.

TABLE (Based on Aspen Simulation)

| Stream | Temperature (° C.) | Pressure (kPa) | Vapor Fraction | Mass Flow Rate (kg/sec) |
|---|---|---|---|---|
| 901 | 600 | 100 | 1 | 1 |
| 902 | 562 | 100 | 1 | 1 |
| 903 | 242 | 100 | 1 | 1 |
| 904 | 35 | 100 | 1 | 1 |
| 905 | 40 | 100 | 1 | 0.91 |
| 200 | 39 | 200 | 0 | 3.5 |
| 201 | 40 | 4000 | 0 | 3.5 |
| 202 | 62 | 4000 | 0 | 3.5 |
| 203 | 222 | 4000 | 0.02 | 3.5 |
| 205 | 241 | 4000 | 0.05 | 3.5 |
| 300 | 241 | 4000 | 0 | 3.34 |
| 301 | 65 | 4000 | 0 | 3.34 |
| 302 | 65 | 100 | 0 | 3.34 |
| 401 | 241 | 4000 | 1 | 0.16 |
| 402 | 400 | 4000 | 1 | 0.16 |
| 403 | 99 | 100 | 1 | 0.16 |
| 406 | 45 | 100 | 0.16 | 0.16 |
| 407 | 40 | 100 | 0.14 | 0.16 |
| 500 | 40 | 100 | 0 | 0.1 |
| 600 | 40 | 100 | 1 | 0.06 |
| 601 | 40 | 10000 | 1 | 0.06 |

While various exemplary embodiments of the invention have been described above and in the attached drawings, further modifications will be apparent to those of ordinary skill in the art from these examples and the description. The scope of the invention is to be determined with reference to the claims that follow.

The invention claimed is:

1. A process for reducing the amount of $CO_2$ released into the atmosphere with the exhaust gas stream produced by the combustion of a hydrocarbon fuel in an internal combustion engine (ICE) used to power a vehicle by capturing at least a portion of the $CO_2$ with a sorbent on board the vehicle, recovering the $CO_2$ from the sorbent and compressing the $CO_2$ for temporary storage on board the vehicle, the process characterized by
 a. passing the hot exhaust gas stream from the ICE through a plurality of heat exchangers in a first heat exchange zone to reduce the temperature of the exhaust gas stream to a value in a predetermined temperature range;
 b. contacting the cooled exhaust gas stream in an absorption zone with a liquid $CO_2$ sorbent solution at a temperature within a predetermined temperature range, the solution comprising a liquid solvent in which is dissolved at least one compound that reversibly combines with $CO_2$ to capture at least a portion of the $CO_2$ from the exhaust gas stream to provide a $CO_2$-rich solution;
 c. separating the $CO_2$-rich solution from the remaining exhaust gas stream that is of reduced $CO_2$ content;
 d. discharging the remaining exhaust gas stream of reduced $CO_2$ content into the atmosphere;
 e. pressurizing the $CO_2$-rich solution and passing it into a boiler for passage in a first heat exchange relation with the exhaust gas stream to raise its temperature to desorb the $CO_2$ and provide a concentrated $CO_2$-lean sorbent solution, and to vaporize a portion of the solvent from the sorbent solution to provide a vaporized solvent/$CO_2$ mixture;
 f. separating the $CO_2$-lean sorbent solution from the vaporized solvent/$CO_2$ mixture in a first separation zone;
 g. passing the vaporized solvent/$CO_2$ mixture to a superheating zone where it passes in a second heat exchange relation with the hot exhaust gas stream directly from the ICE to further increase the temperature of the mixture;
 h. passing the superheated solvent/$CO_2$ mixture to a turbine and expanding the mixture to a predetermined pressure value;
 i. passing the hot expanded solvent/$CO_2$ mixture in heat exchange with the pressurized $CO_2$-rich solution of step (e);
 j. passing the solvent/$CO_2$ mixture to a condensing heat exchanger to lower its temperature to condense substantially all of the solvent vapor to the liquid state;
 k. separating the condensed solvent from the $CO_2$ in a second separation zone and mixing all or a portion of the condensed solvent with the sorbent solution upstream of the absorption zone or discharging the solvent from the vehicle;
 l. recovering the substantially pure $CO_2$ from the second separation zone and passing it to a compression zone to compress and densify the $CO_2$ and discharging any remaining water;
 m. recovering the pressurized pure $CO_2$ and passing it to an on-board vessel for storage or for further processing to reduce its volume by changing its physical state;
 n. passing the pressurized $CO_2$-lean solution from the first separation zone in heat exchange relation to increase the temperature of the pressurized $CO_2$-rich solution from the absorption zone;
 o. introducing the pressurized $CO_2$-lean solution into an expansion device to produce mechanical energy;
 p. passing the reduced-pressure concentrated $CO_2$-lean solution from the expansion device to a mixing device through which solvent is added to restore the desired concentration of the sorbent solution;
 q. cooling the $CO_2$-lean solution to the predetermined temperature range prior to passing it into the absorption zone; and
 r. pressurizing the $CO_2$-lean sorbent solution upstream of the absorption zone.

2. The process of claim 1 in which the solvent is water.

3. The process of claim 2 in which the increase in the temperature of the water/$CO_2$ mixture in step (g) is in the range of from 200° to 500° C.

4. The process of claim 1 in which the $CO_2$-rich solution from the absorption zone is passed to the intake of a pump to increase its pressure to a predetermined system pressure.

5. The process of claim 1 in which the first heat exchange zone includes a final heat exchanger passing a cooling fluid at the predetermined temperature of the exhaust gas stream entering the absorption zone.

6. The process of claim 1 in which the mechanical energy output of the turbine and/or the expansion device is used directly to turn one or more pumps and/or one or more $CO_2$ compressors.

7. The process of claim 1 in which the mechanical energy output of the turbine and/or expansion device is used to generate electricity that is used to power pumps and or compressor motors and/or to charge a storage battery on board the vehicle.

8. The process of claim 1 in which the sorbent solution is prepared from one or more compounds selected from the group consisting of water, amine-functionalized molecules, alkali metal carbonates and bicarbonates, alkaline earth metal carbonates, alkali metal and alkaline earth metal oxides, aqueous ammonia and ammonium carbonate, alcohols, polyethers, amide compounds, molecular sieves, MOFs, COFs.

9. The process of claim 8 in which the polyether is a dimethylether of polyethylene glycol.

10. The process of claim 8 in which the $CO_2$ absorbing amide compound is N-methyl-2-pyrrolidone.

11. The process of claim 8 in which the solvent is methanol.

12. The process of claim 8 in which the $CO_2$ absorbing amine is monoethanolamine.

13. The process of claim 8 in which the $CO_2$ absorbing carbonate is potassium carbonate.

* * * * *